(12) United States Patent
Nord et al.

(10) Patent No.: US 11,012,969 B2
(45) Date of Patent: May 18, 2021

(54) SYSTEM AND METHOD FOR DETERMINING DEVICE LOCATION

(71) Applicant: SONY MOBILE COMMUNICATIONS INC., Tokyo (JP)

(72) Inventors: Lars Nord, Lund (SE); Basuki Priyanto, Lund (SE); Anders Larsson, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 337 days.

(21) Appl. No.: 15/779,726

(22) PCT Filed: Jan. 14, 2016

(86) PCT No.: PCT/US2016/013401
§ 371 (c)(1),
(2) Date: May 29, 2018

(87) PCT Pub. No.: WO2017/123229
PCT Pub. Date: Jul. 20, 2017

(65) Prior Publication Data
US 2020/0305115 A1    Sep. 24, 2020

(51) Int. Cl.
*H04W 4/90* (2018.01)
*H04W 64/00* (2009.01)
(Continued)

(52) U.S. Cl.
CPC ......... *H04W 64/006* (2013.01); *G01S 5/0289* (2013.01); *G01S 5/14* (2013.01);
(Continued)

(58) Field of Classification Search
CPC ....... H04W 4/02; H04W 4/021; H04W 4/029; H04W 4/50; H04W 56/0005;
(Continued)

(56) References Cited

U.S. PATENT DOCUMENTS 7,602,339 B2 * 10/2009 Fullerton ............... G01S 5/0289
342/458
7,974,637 B1 * 7/2011 Taveniku ............. G06Q 20/203
455/456.1
(Continued)

FOREIGN PATENT DOCUMENTS

CN     103891353 A    6/2014
CN     104125538 A    10/2014
(Continued)

OTHER PUBLICATIONS

International Search Report and Written Opinion from corresponding International Patent Application No. PCT/US2016/013401, dated Nov. 4, 2016.
(Continued)

*Primary Examiner* — Jean A Gelin
(74) *Attorney, Agent, or Firm* — Tucker Ellis LLP (57) ABSTRACT

Location of an electronic device is determined using signals received from a first set of reference radios. The first set of reference radios include at least one secondary reference radio, each secondary reference radio established as a secondary reference radio by registering a corresponding location with a server. The corresponding location of the secondary reference radio is determined as a function of signals received by the secondary reference radio from a second set of reference radios. The second set of reference radios include radios qualified as reference radios in a database of
(Continued)

primary se reference radios and secondary reference radios, each primary reference radio being a fixed-location radio device.

20 Claims, 5 Drawing Sheets

(51) Int. Cl.
    *G01S 5/02*     (2010.01)
    *G01S 5/14*     (2006.01)
    *H04W 4/02*     (2018.01)
    *H04W 60/00*     (2009.01)

(52) U.S. Cl.
    CPC ............. *H04W 4/025* (2013.01); *H04W 4/90* (2018.02); *H04W 60/00* (2013.01)

(58) Field of Classification Search
    CPC . H04W 56/001; H04W 64/003; H04W 72/00; H04W 4/025; H04W 4/90; H04W 60/00; H04W 64/00; H04W 64/006; G01S 5/0242; G01S 5/0289; G01S 5/14
    See application file for complete search history.

(56) References Cited

U.S. PATENT DOCUMENTS

| | | | | |
|---|---|---|---|---|
| 8,422,986 | B1* | 4/2013 | Martin | G08B 27/00 455/404.1 |
| 8,489,122 | B2* | 7/2013 | Gravely | G01S 5/14 455/456.5 |
| 8,571,578 | B1* | 10/2013 | Chen | G01S 5/0009 455/456.1 |
| 8,825,078 | B1* | 9/2014 | Mishra | G01S 5/0278 455/456.1 |
| 9,277,365 | B1* | 3/2016 | Wilden | H04W 64/00 |
| 2005/0232189 | A1* | 10/2005 | Loushine | H04W 64/00 370/328 |
| 2008/0189360 | A1 | 8/2008 | Kiley et al. | |
| 2010/0085947 | A1* | 4/2010 | Ringland | H04W 28/0226 370/338 |
| 2012/0208500 | A1* | 8/2012 | Ledlie | H04M 1/67 455/410 |
| 2014/0074399 | A1* | 3/2014 | Kelly | G01C 21/206 701/522 |
| 2014/0148183 | A1* | 5/2014 | Stanforth | H04W 64/00 455/452.1 |
| 2014/0162544 | A1* | 6/2014 | Edge | H04L 12/1868 455/3.01 |
| 2014/0331329 | A1* | 11/2014 | Edge | G01S 5/0205 726/26 |
| 2015/0312739 | A1* | 10/2015 | Burt | A61B 7/00 455/404.1 |
| 2018/0367947 | A1* | 12/2018 | Kim | H04W 4/021 |
| 2020/0154239 | A1* | 5/2020 | Yamada | H04W 4/029 |

FOREIGN PATENT DOCUMENTS

| | | |
|---|---|---|
| WO | 2009/011822 A2 | 1/2009 |
| WO | 2009011822 A2 | 1/2009 |

OTHER PUBLICATIONS

Office Action from corresponding Chinese Application No. 201680079438.0, dated Dec. 3, 2019, 8 pages.
European Office Action for corresponding European Application No. 16702624.4, dated Aug. 8, 2020, 5 pages.

* cited by examiner

FIG. 5

SYSTEM AND METHOD FOR DETERMINING DEVICE LOCATION

TECHNICAL FIELD OF THE INVENTION

The technology of the present disclosure relates generally to electronic devices and, more particularly, to a system and method for facilitating the determination of the geo-location of an electronic device, such as an access point (AP) or a user equipment (UE).

BACKGROUND

Accurate location determination of electronic devices, such as mobile phones, is beneficial to the proper operation of cellular communication systems, such as a universal mobile telecommunications system (UMTS) or a system based on long-term evolution (LTE). One reason to have accurate location determination mechanisms is to provide emergency localization of a user equipment (UE) that makes an emergency call. In some jurisdictions, the ability to provide emergency localization is required by a governing regulatory body, such as the Federal Communications Commission (FCC) in the United States.

Conventional radio access technologies (RATs) employ positioning techniques that rely on existing base stations (e.g., evolved node B (eNB) base stations) that emit positioning reference signals (PRS). Exemplary location determining techniques of this nature include cell ID (CID), observed time difference of arrival (OTDOA), and uplink-time difference of arrival (UTDOA). OTDOA, for example, is a technique that may be used to locate a UE by triangulation using signals from at least three base stations.

In practice, the locations of the base stations may be relatively far from the UE and obstacles such as buildings, trees, and moving objects (e.g., vehicles) may disrupt the signals. Disruption can be even more prevalent when the UE is located indoors. Signal disruption can degrade received PRS signal quality at the UE, which may result in high positioning estimation error.

SUMMARY

The disclosed techniques involve determining and registering the location of one or more reference radios, such as local area network (LAN) access points (APs). Exemplary APs that may be used are WiFi access points. Signals from one or more registered APs may be used when estimating the location of another AP or a UE. The disclosed approach involves "self assisted" location determination of the reference APs and, therefore, avoids issues in manually determining the location of the reference APs. The location of an AP may be updated on a triggering event such as movement of a reference AP.

According to one aspect of the disclosure, an electronic device includes communications circuitry over which wireless signals are transmitted and received; and control circuitry configured to determine location of the electronic device using signals received from a first set of reference radios, the first set of reference radios including at least one secondary reference radio, each secondary reference radio established as a secondary reference radio by registering a corresponding location with a server, the corresponding location of the secondary reference radio determined as a function of signals received by the secondary reference radio from a second set of reference radios, the second set of reference radios including radios qualified as reference radios in a database of primary reference radios and secondary reference radios, each primary reference radio being a fixed-location radio device.

According to one embodiment of the electronic device, the control circuitry is further configured to: register the determined location with the server, the server hosting a location service for electronic devices and, once registered, the electronic device being qualified as one of the secondary reference radios for the electronic devices that use the location service to determine their respective locations; and transmit signals via the communication circuitry that aid the electronic devices that use the location service in determining their respective locations.

According to one embodiment of the electronic device, the signals transmitted by the electronic device are positioning reference signals.

According to one embodiment of the electronic device, the signals transmitted by the electronic device are WiFi beacons.

According to one embodiment of the electronic device, the signals transmitted by the electronic device are one of Bluetooth beacons or RF ID signals.

According to one embodiment of the electronic device, the electronic device is an access point that provides network connectivity to one or more user equipment devices.

According to one embodiment of the electronic device, the electronic device is a WiFi access point.

According to one embodiment of the electronic device, the electronic device is a user equipment device.

According to one embodiment of the electronic device, the first set of reference radios comprises at least one primary reference radio.

According to one embodiment of the electronic device, the second set of reference radios comprises at least one primary reference radio.

According to one embodiment of the electronic device, the second set of reference radios comprises at least one secondary reference radio.

According to one embodiment of the electronic device, determining the location of the electronic device includes triangulating a position for the electronic device at the server.

According to one embodiment of the electronic device, the primary reference radios comprise base stations of one or more cellular networks.

According to one embodiment of the electronic device, the primary reference radios comprise terrestrial navigation transmitters.

According to one embodiment of the electronic device, the signals received from primary reference radios are positioning reference signals.

According to another aspect of the disclosure, a server that hosts a location service, includes a memory that stores a database of primary reference radios, secondary reference radios and locations of each of the primary and secondary reference radios, the primary reference radios being fixed location and the secondary reference radios being radios that have autonomously registered with the server, location of each secondary reference radio determined as a function of signals received by the secondary reference radio from a set of reference radio devices comprising primary reference radios, previously registered secondary reference radios, or one or more primary reference radios and one or more previously registered secondary reference radios; and a processor that executes logical instructions to determine a location of an electronic device that senses signals from reference radios in the database.

According to one embodiment of the server, the determined location of the electronic device controls routing of an emergency call made by the electronic device.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

INTRODUCTION

Described below are techniques for self-assisted reference radio geolocation determination. The determined location may be registered in a location service database and subsequently used to assist in providing relatively precise estimates of geolocation other electronic devices. Prior to location determination of the reference radio, the reference radio may be unknown to a location service that maintains a database of device locations. The database may include the locations of fixed-location, macro-cell base stations (a current example of which are eNBs) or other types of primary reference radios that may be used in determining the location of various electronic devices.

Upon registration with the location service, the reference radio may be used in location determination of another device (e.g., UE or AP). The location of the reference radio is determined using positioning information (e.g., PRS signals) that is received from the base stations. Therefore, one may consider the determination of location of a UE or AP using a reference radio as cascading location data from radios having very well-known locations (e.g., the base stations) to another device via an intermediate device (e.g., the reference radio). In other words, the disclosed techniques cascade qualified, automated positioning acquisition information through layers of devices.

In one embodiment, devices that determine location under the disclosed techniques and then serve as reference radios are equipped with at least one RAT that supports determining location of the device based on signals from primary and secondary reference radios. For example, when primary reference radios include base stations deployed by mobile telephone service providers, the reference devices may support OTDOA or other location determining techniques available from a network that operates under a protocol such as wideband code division multiple access (WCDMA) or LTE.

System Architecture

Figure 1:
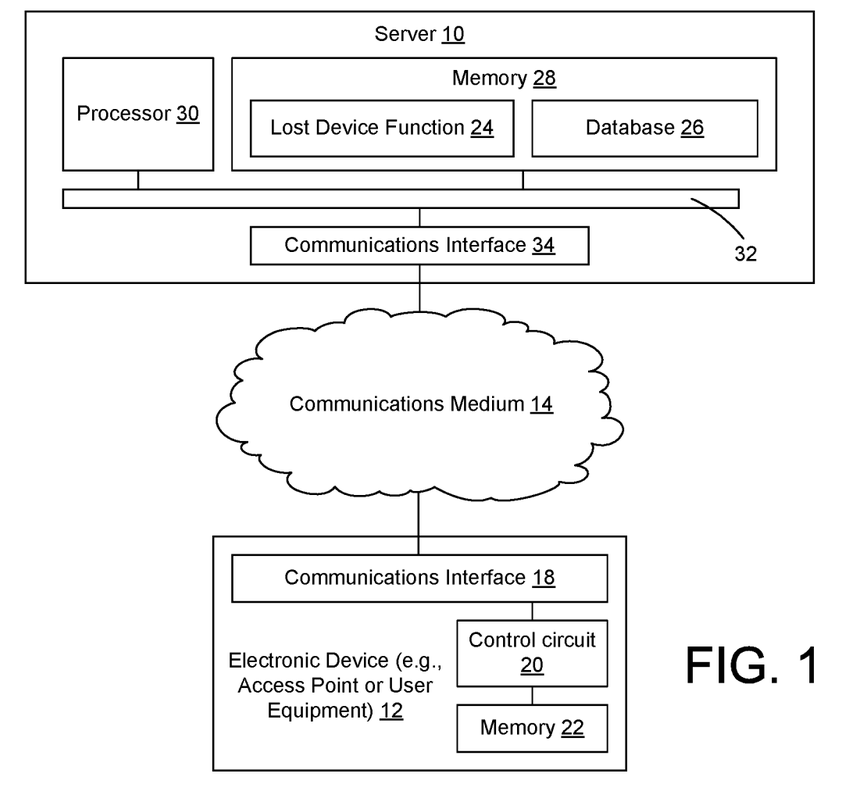
FIG. 1 is a schematic diagram of a system for determining and registering electronic device location.

FIG. 1 is a schematic diagram of an exemplary system for implementing the disclosed techniques. It will be appreciated that the illustrated system is representative and other systems may be used to implement the disclosed techniques. Also, functions disclosed as being carried out by a single device, such as the disclosed server, may be carried out in a distributed manner across nodes of a computing environment.

The system includes a server 10 that is in operative communication with various electronic devices, including the illustrated electronic device 12 for which a location is desired. The electronic device 12 may be one of a variety of types of devices, such as an access point (AP) for a LAN (e.g., a WiFi router), an AP for a small cell in a cellular network (sometimes referred to as a pico-cell), or a user equipment such as a mobile phone, a tablet computer, a laptop computer, a desktop computer, a gaming device, etc. As will be described, the server 10 and the electronic device 12 are configured to carry out the respective logical functions that are described herein.

The server 10 communicates with the electronic device 12 over any appropriate communications medium 14, such as one or more of the Internet, a cellular or subscriber network that includes one or more base stations 16 (FIGS. 2-4), a WiFi network, etc. In addition to carrying out the operations described herein, the server 10 may carry out other support and service operations for the electronic device 12.

The electronic device 12 includes one or more communications interfaces 18 to allow for communications over various types of network connections and/or protocols. The communications interfaces may include, for example, one or more interfaces to communication cables and/or the communications interfaces may include radio circuitry that includes one or more radio modems (e.g., radio transceivers) and corresponding antenna assemblies. Overall functionality of the electronic device 12 may be controlled by a control circuit 20 that may include a processor. In one embodiment, the control circuit 20 may execute code containing logical instructions that is stored in a memory 22. For instance, the control circuit 20 may be used to execute an operating system and other applications that are installed on the electronic device 12. The operating system or applications may include executable logic to implement the functions of the electronic device 12 that are described herein. The memory 22 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 22 includes a non-volatile memory for long term data storage and a volatile memory that functions as system memory. Data that is used or accessed by the electronic device 12 may be stored by the memory 22. The described operations that are carried out by the electronic device 12 may be thought of as a method that is carried out by the electronic device 12.

The electronic device 12 may include other components including, without limitation, input/output (I/O) interfaces. The I/O interfaces may include a display for displaying information to a user, a touch input that overlays or is part of the display for touch screen functionality, one or more buttons, motion sensors (e.g., gyro sensors, accelerometers), a speaker, a microphone, etc. Other components may include a rechargeable battery-based power supply, a camera, a position data receiver (e.g., a global positioning system (GPS) receiver), a subscriber identity module (SIM) card slot in which a SIM card is received, etc.

The server 10 may be implemented as a computer-based system that is capable of executing computer applications (e.g., software programs), including a location service function 24 that, when executed, carries out functions of the server 10 that are described herein. The location service function 24 and a database 26 may be stored on a non-transitory computer readable medium, such as a memory 28. The database 26 may be used to store various information sets used to carry out the functions described in this disclosure.

For instance, the server 10 may store and access a database of electronic devices and their corresponding locations. The locations of the electronic devices in the database may be considered qualified to assist in the determination of the location of other electronic device. The memory 28 may be a magnetic, optical or electronic storage device (e.g., hard disk, optical disk, flash memory, etc.), and may comprise several devices, including volatile and non-volatile memory components. Accordingly, the memory 28 may include, for example, random access memory (RAM) for acting as system memory, read-only memory (ROM), solid-state drives, hard disks, optical disks, flash devices and/or other memory components, plus associated drives, players and/or readers for the memory devices.

To execute logical operations, the server 10 may include one or more processors 30 used to execute instructions that carry out logic routines. The processor 30 and the memory 28 may be coupled using a local interface 32. The local interface 32 may be, for example, a data bus with accompanying control bus, a network, or other subsystem.

The server 10 may have various input/output (I/O) interfaces for operatively connecting to various peripheral devices, as well as one or more communications interfaces 34. The communications interface 34 may include for example, a modem and/or a network interface card. The communications interface 34 may enable the server 10 to send and receive data signals to and from other computing devices via an external network. In particular, the communications interface 34 may operatively connect the server 10 to the communications medium 14.

Figure 2:
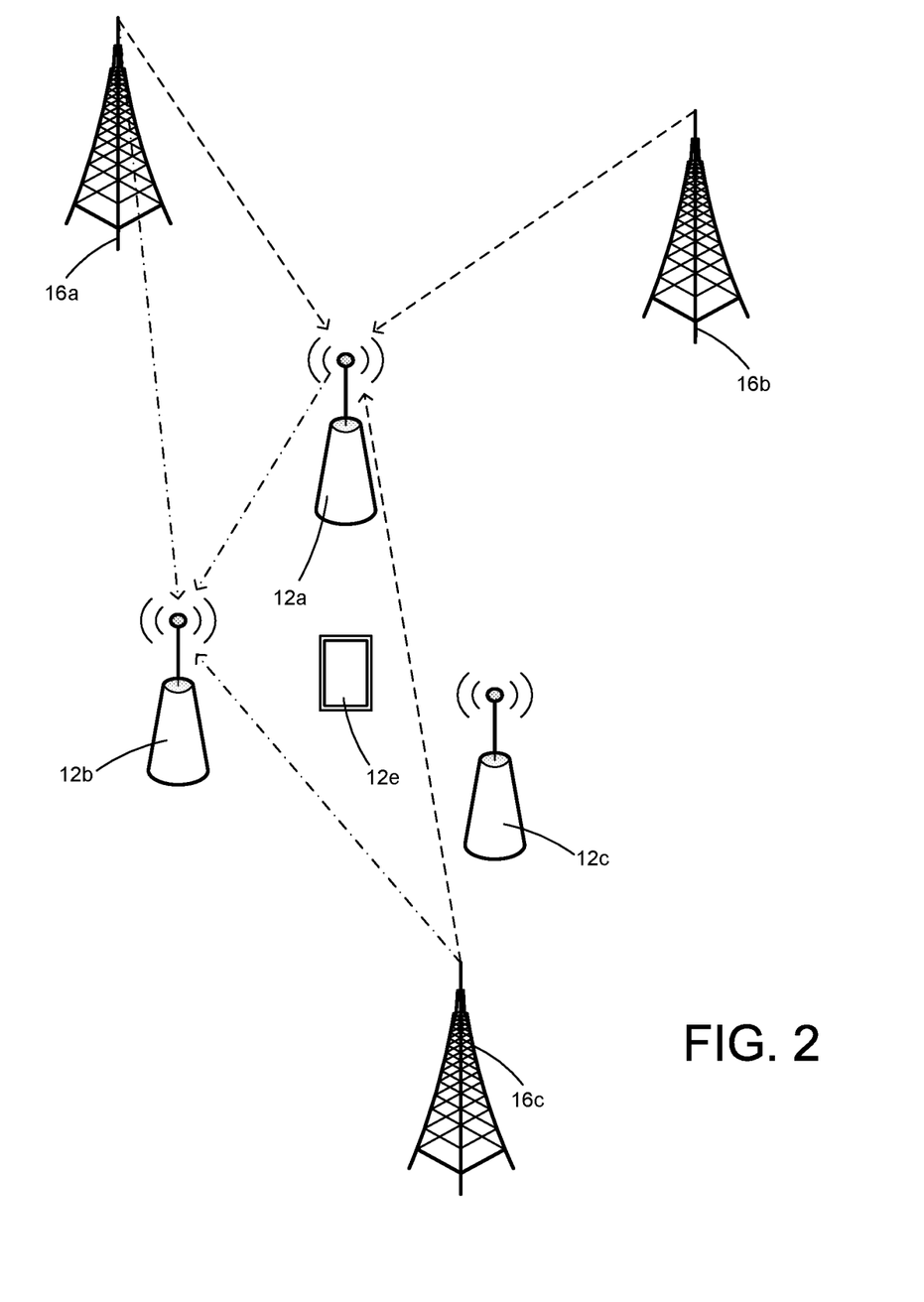
FIG. 2 is a schematic diagram of a representative environment in which the locations of exemplary secondary reference radio devices are determined.

With additional reference to FIG. 2, illustrated is a schematic diagram of a representative environment in which the locations of reference radio devices are determined. In the representative environment, three base stations are present and are respectively designated by reference numerals 16*a*, 16*b* and 16*c*. It will be appreciated there may be more than or fewer than three base stations 16 that have operative coverage in any specific location. In the illustrated embodiment, the base stations 16 form part of a subscriber network and are configured as, for example, base stations.

For purposes of this description, the base stations 16 are considered to have highly dependable locations. For instance, the base stations 16 are fixed location devices with known locations. The base stations 16 and their locations are known to the location service offered by the server 10 and serve as primary reference radios for determining the locations of other electronic devices.

The environment also may include other devices, such as electronic devices 12. The electronic devices 12 may be, for example, APs and UEs. In the representative environment, three APs are present and are respectively designated by reference numerals 12*a*, 12*b* and 12*c*. It will be appreciated there may be more than or fewer than three APs that have operative coverage in any specific location. In the illustrated embodiment, the APs are capable of determining their respective locations using the techniques described below.

The APs having locations derived from data traceable to one or more base stations 16 may register with the location service offered by the server 10 and serve as secondary reference radios for determining the locations of other electronic devices 12. As will be described, the determined locations of the secondary reference radios may be used to determine the locations of additional electronic devices 12, such as additional APs or UEs. In the representative environment, one UE is present and is designed by reference number 12*e*. It will be appreciated there may be more than one UE that is within the coverage area of one or more base stations 16 and/or one or more APs.

Figure 3:
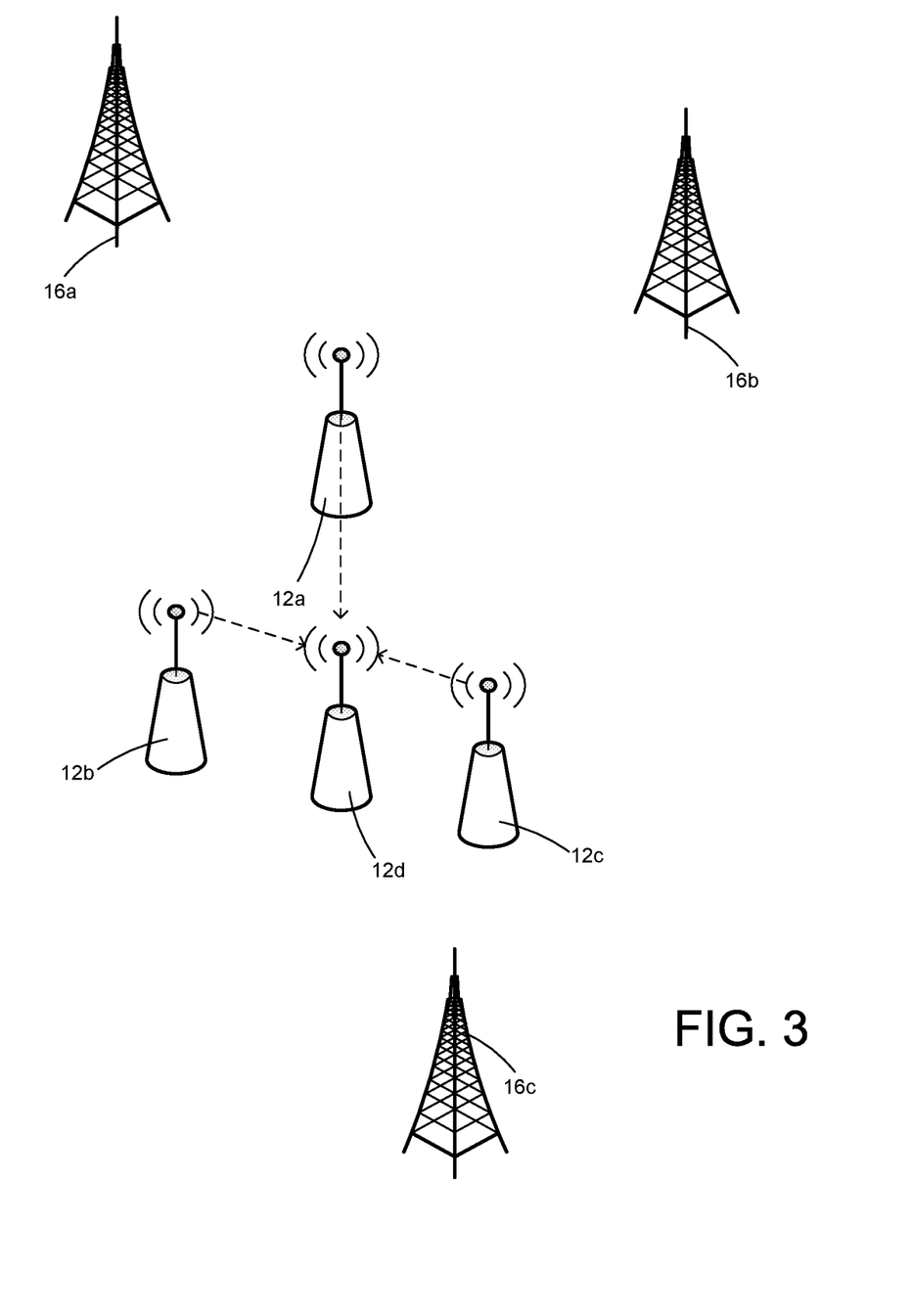
FIG. 3 is a schematic diagram of a representative environment in which the location of another exemplary secondary reference radio device is determined using signals from reference radio devices.
Figure 4:
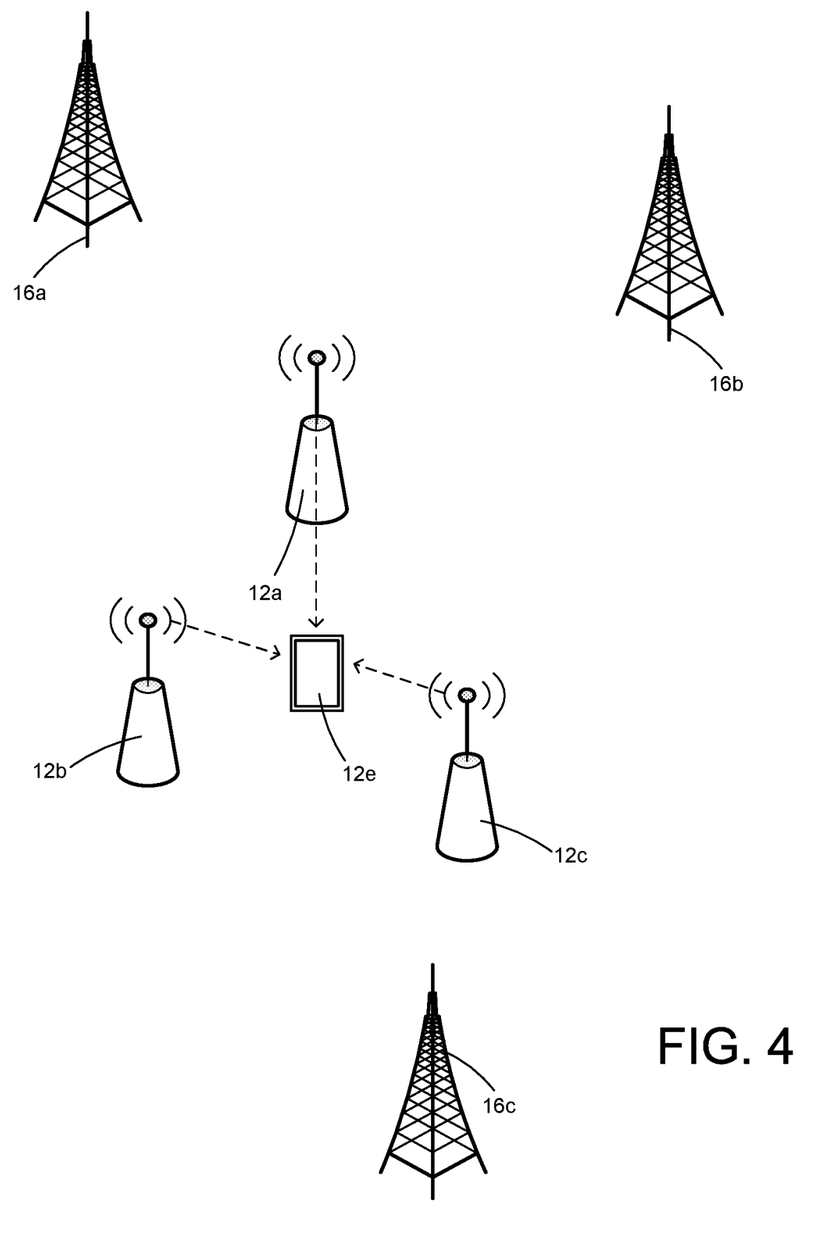
FIG. 4 is a schematic diagram of a representative environment in which the location of a user equipment is determined using signals from reference radio devices.

FIGS. 3 and 4 illustrate the same representative environment for location determination. Each of FIGS. 2, 3 and 4, however, show different operational scenarios for determining the location of different types of electronic devices 12 as will be described below in connection with FIG. 5.

Location Determination

Figure 6:
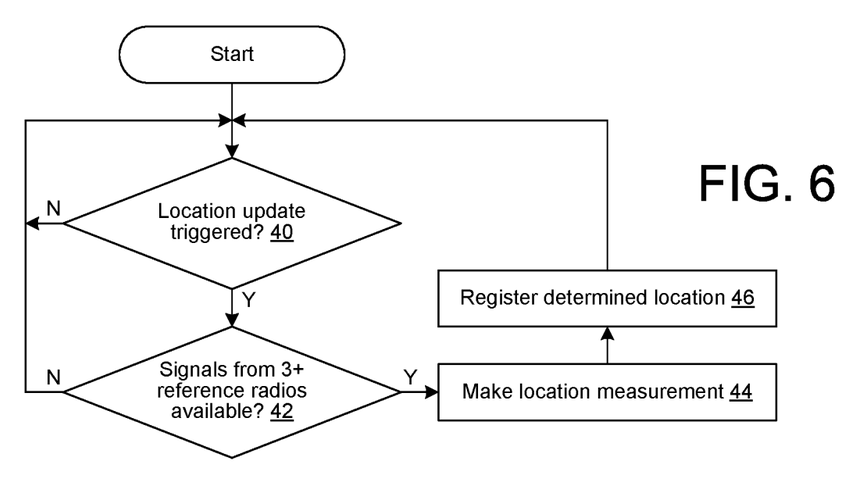
FIG. 6 is a flow-diagram of a location determination operation for a reference radio device or a user equipment.

With additional reference to FIG. 6, techniques for determining the location of electronic devices 12 will be described in greater detail. FIG. 6 illustrates an exemplary flow diagram representing steps that may be carried out by the electronic device 12 during location determination. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner. Coordinating steps carried out by the server 10 will be understood from the following description.

The logical flow may start in block 40 where a determination is made as to whether the electronic device 12 should determine its location. In one embodiment, the electronic device 12 determines if a location update trigger for the electronic device 12 is detected. An exemplary location update trigger includes detecting that a predetermined amount of time has elapsed since the last time the electronic device 12 determined its location. For APs that move infrequently, the time between location determinations may be relatively long. Another exemplary location update trigger includes detecting movement of the electronic device 12, such as by monitoring output of a motion sensor in the electronic device 12. Another exemplary location update trigger includes sensing a stronger signal (e.g., a PRS signal) from which location may be determined than was used during the immediately prior determination of location under the premise that signals with higher signal strength will provide more accurate location estimation. Another exemplary location update trigger includes sensing a change in the number of signals from which location may be determined and/or a change in the sources of the signals from which location may be determined.

The use of location update triggers allows the electronic device 12 to take steps to update its measured location automatically and without user intervention.

If a determination is made that a location update trigger has not occurred, then the electronic device 12 may wait until a location update trigger occurs. If a determination is made that a location update trigger has occurred, then the logical flow may proceed to block 42.

In block 42, a determination is made as to whether signals are received from each of three or more reference radios and from which location determination may be made. The reference radios may be one or more primary reference and/or one or more secondary reference radios. A primary reference radio is a radio known to the server 10 as having a fixed-location, such as a location that is independently ascertained (e.g., by an installer of the radio device) or qualified as a fixed-location device by regulation. Exemplary primary reference radios include, but are not limited to, base stations deployed by one or more cellular service providers, terrestrial navigation transmitters (e.g., NEXTNAV® radios), or WiFi access points that are permanently associated with fixed infrastructure. Secondary reference radio devices are radios for which location is determined and registered in accordance with this description. Exemplary secondary reference radios are WiFi access points.

The determination of block 42 may include determining if PRS signals, WiFi beacons, Bluetooth beacons, RF ID signals, or other signals from three or more reference radio devices can be detected at the actual location of the electronic device 12. If so, a location measurement is made in block 44. Location measurement may be made by estimating actual geolocation of the electronic device 12 using triangulation based on the received PRS signals, WiFi beacons, Bluetooth beacons, RF ID signals, or other signals from the reference radio devices. The location determination may be made by the electronic device 12 or by the server 10. If the server 10 makes the location determination, the electronic device 12 may transmit relevant data to the server 10, such as reference radio identity associated with received signals and, if appropriate, time of arrival and/or signal strength data. The server 10 may correlate each reference radio identity sent by the electronic device 12 against the database of locations for the reference devices and carry out triangulation to make an estimate of the location of the electronic device 12.

An exemplary instance of location determination using signals from primary reference radios (e.g., base stations 16) is illustrated in FIG. 2. In this instance, as represented by the broken lines, signals from the three base stations 16*a*, 16*b* and 16*c* are received by the AP 12*a* and used to determine the location of the AP 12*a*.

An exemplary instance of location determination using signals from a mix of primary reference radios and secondary reference radios is also illustrated in FIG. 2. In this instance, as represented by the dash-dot lines, signals from the two primary reference radios (base stations 16*a* and 16*c*) are received by the AP 12*b* and used with a signal from AP 12*a* (functioning as a registered secondary reference radio) to determine the location of the AP 12*b*.

An exemplary instance of location determination using signals from secondary reference radios is illustrated in FIG. 3. In this instance, as represented by the broken lines, signals from APs 12*a*, 12*b* and 12*c* (each functioning as a registered secondary reference radio) are received by AP 12*d* and used to determine the location of the AP 12*d*.

Following location determination in block 44, the electronic device 12 may register as a secondary reference radio device with the server 10 in block 46. Registering as a secondary reference radio may include registering the device's estimated location (from block 44) and device's identity with the location service. Registration in block 46 may further include recording a degree of precision of the determined location. As is known in the art, degree of precision may be generated (e.g., mathematically) based on the triangulation approach, the number of signals used in the triangulation process, signal strengths and/or other criteria. In an alternative embodiment, the degree of precision may be a relative ranking based on the types of reference radio devices from which signals were received and used in the location determination. For instance, the ranking approach may favor the use of signals from primary reference radios, the ranking approach may favor the user of signals from secondary reference radios, or the ranking approach may apply a combination of conventional degree of precision factors (e.g., as just described) and the reference radio type. The degree of precision data may be used, in turn, to judge the accuracy of location determinations made by other electronic devices 12 that rely on signals from the device registered in block 46.

As will be described, signals from secondary reference radios may be used by electronic device 12 to make location determinations. In one embodiment, the server 10 authorizes APs that have registered as secondary reference radio devices to broadcast PRS signals or another signal from which location may be triangulated using signals from two or more other sources. The signal may include a code or other information that identifies the secondary reference radio as being a qualified (e.g., authorized) source of PRS signals. The typical transmission rate for PRS signals by an eNB base station is fairly high (e.g., a PRS interval of 160 ms). APs that broadcast PRS signals may transmit with lower frequency, such as a PRS interval of N*160 ms, where N is an integer and may be in the range of one to 100 (or higher). The PRS signal broadcast by the AP may include an identity of the AP, such as MAC address, device identifier or identifier assigned by the server 10.

In another embodiment, the signal from the secondary reference radio need not be a specialized signal or a PRS signal. For instance, when the secondary reference radio is a WiFi AP, the signal may be a WiFi beacon. Other exemplary signals include, but are not limited to, a Bluetooth beacon and an RF ID signal. When the WiFi beacon or other signal is detected by another electronic device 12 during a location measurement operation, the electronic device 12 may seek a corresponding location from the location service. Alternatively, the determined location of the secondary reference radio may be included in the beacon or signal. In other cases, such as when the location service determines the location of the electronic device 12 based on information received by the electronic device 12, the location of the reference radios need not be shared with the electronic device 12.

In the location determination of block 44, any combination of primary and secondary reference radios is acceptable, such as one secondary reference radio and two primary reference radios, two secondary reference radios and one primary reference radio, three or more secondary reference radios, or three of more primary reference radios. If there are not signals available from at least three reference radios in block 42, the location determination routine may fail and return to block 40. Alternatively, a coarse location estimate may be made if one or two signals are available.

In the location determination of block 44, it is possible that signals from more than three reference radios may be available. In this case, a location estimate for the electronic device 12 may be made using more than three signals. In one embodiment, the received signals meeting a minimum signal strength may be used. If there are a large number of signals available, then the number of signals used may be capped, such as at six signals. In another embodiment, the signals that are used are those having the highest signal strengths, those that are associated with radio locations having the highest accuracy rank (e.g., highest degree of precision), or those that have the best weighted combination of signal strength and associated accuracy. In this manner, there are circumstances where weak signals from primary reference radios may be excluded from consideration in favor of signals from strong signals from secondary reference radios.

In another embodiment, some electronic devices 12 may determine their locations using an alternative mechanism, such by using a satellite-based methodology (e.g., global positioning system (GPS) signals or signals from the global navigation satellite system (GLONASS)). The electronic devices 12 that determine location using an alternative mechanism may register the determined locations with the location service and then serve as secondary reference devices for other electronic devices 12. For instance, some electronic devices may not have a GPS receiver or GLONASS receiver and/or cellular communication capability (e.g., 2G, 3G, 4G, 5G or similar). Exemplary devices of this nature are WiFi only devices, In other circumstances, the electronic device 12 may be out of range of signals from base stations or may be in a situation where satellite signals and/or signals from base stations are unreliable (e.g., indoors). In these cases, the electronic device 12 may still be able to ascertain its location using signals from primary reference devices and/or secondary reference devices.

If the electronic device 12 is already registered as a secondary reference radio, the registering in block 46 need not be carried out every time a location determination is made. In one embodiment, the registering of block 46 may be made only if the current location measurement is above a predetermined threshold, such as a determination that the current measurement has a degree of precision that is greater than the degree of precision of a location measurement that is already registered with the location service. The electronic devices 12 that register as secondary reference radios may make the registration automatically (e.g., without user action). This reduces the effort involved with collecting and maintaining locations of electronic devices 12, such as manually determining the position of access points.

As indicated, a UE may follow the technique illustrated in FIG. 6 to make a location determination using signals from one or more secondary reference radios (e.g., APs) and/or one or more primary reference radios (e.g., base stations 16). In some instances, a UE may not be able to receive reliable PRS signals from any base stations 16 (e.g., due to the UE's location being out of range or due to interference) or may not be configured to interpret PRS signals from base stations 16. In this instance, the UE may make a location determination from signals from second reference radios.

An instance of a UE 12e making a location determination using signals from secondary reference radios (e.g., APs 12a, 12b and 12c) is illustrated in FIG. 4. In this instance, the secondary reference radios have acquired respective locations following the technique of FIG. 6 and emit signals detectable by the UE 12e. The UE 12e (or the server 10 on behalf of the UE 12e) then makes a location estimate based on the detected signals from the secondary reference radios as described above.

Figure 5:
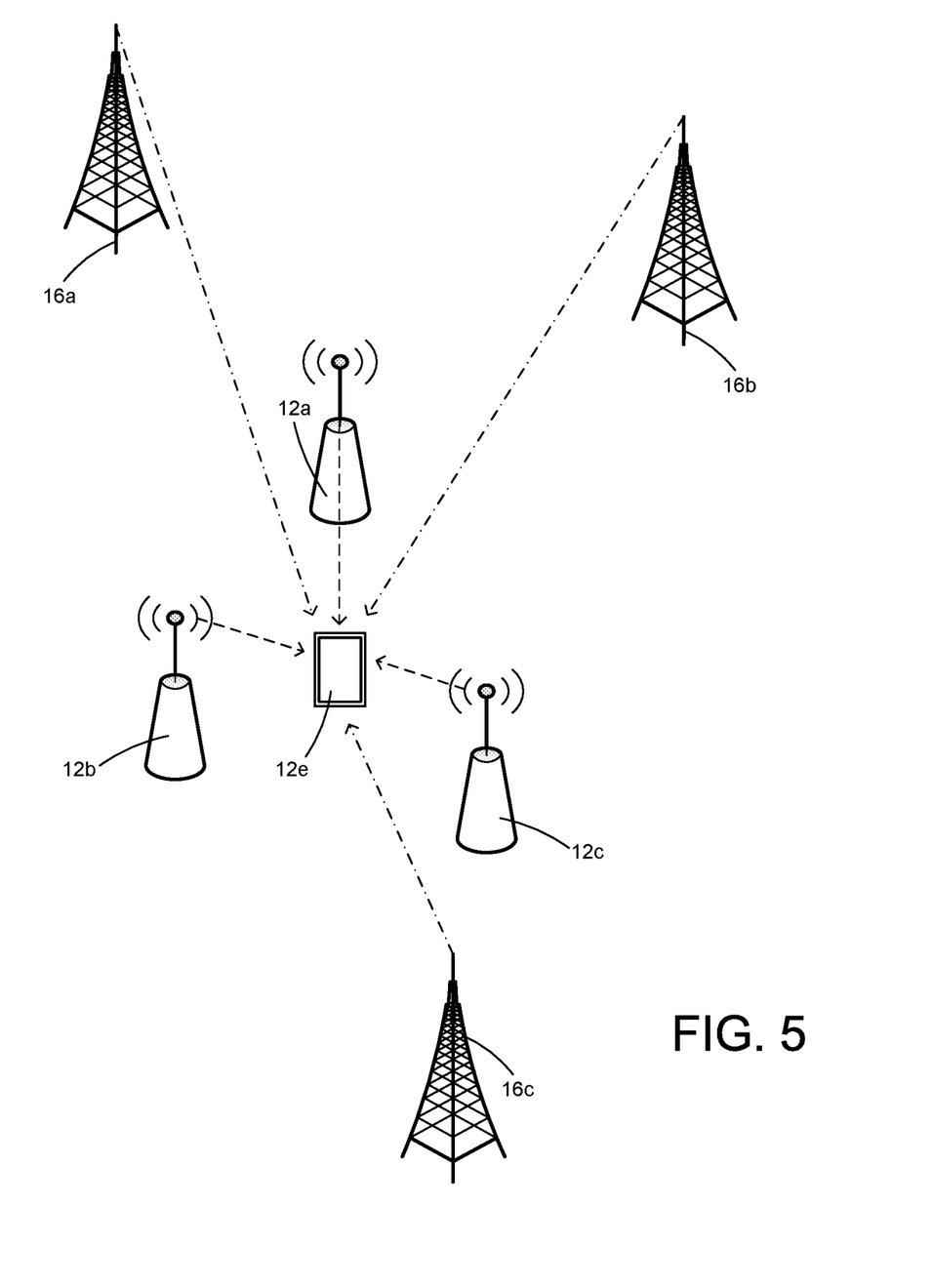
FIG. 5 is a schematic diagram of another representative environment in which the location of a user equipment is determined using signals from reference radio devices.

FIG. 5 illustrates still another scenario. In this scenario, the UE may be able to receive signals from three or more primary reference radios (e.g., base stations 16) and signals from three or more secondary reference radios (e.g., APs). In this case, the UE (or server 10 on behalf of the UE) may determine a first location using the signals from the primary reference radios and determine a second location using the signals from the secondary reference radios. The location service (or the UE) may combine both of these positioning results to obtain a location for the UE having a high degree of precision. This approach may be valuable in the situation where the primary reference radios support one positioning technique (e.g., OTDOA for eNB base stations) and the secondary reference radios support a different positioning technique (e.g., WiFi positioning for WiFi APs).

One result of the disclosed techniques is that the database will be populated with relatively precise location measurements for a large number of APs. This data may be used for a variety of geolocation services. For example, the database may be leveraged to increase the success of user provided location information (UPLI) in the initial steps of an emergency call. In one embodiment, the UE making the emergency call may provide the MAC addresses of any APs that the UE detects. The server 10 may quickly cross-reference the MAC addresses against the database of locations and determine a rough location estimation, thereby aiding the network to route the emergency call to a nearby public safety answering point (PSAP). In short, the more MAC addresses that are associated with corresponding "qualified" locations in the database will result in a higher success rate for the initial call routing.

As indicated, one may consider the determination of location of a UE or AP using a secondary reference radio as cascading location data from radios having very well-known locations (e.g., the primary reference radios) to another device via an intermediate device (e.g., one or more secondary reference radios). Even though there may be loss of location accuracy by such cascading of location information, it is contemplated that a reasonable degree of accuracy in the location determination of block 46 may be achieved. As an example, relative geolocation may be determined using the disclosed techniques for a device from which an emergency call is made and the call may be directed to an appropriate emergency call center and/or first responders may be directed to a reasonably sized area.

The location service may be used in operational contexts in addition to emergency call handling. An exemplary additional operational context is for indoor location determination and/or indoor navigation (e.g., guiding a user through a shopping mall, airport, retail facility, warehouse, or other relatively large environment).

CONCLUSION

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   communications circuitry over which wireless signals are transmitted and received; and
   control circuitry configured to determine location of the electronic device using location signals received from a first set of reference radios, the first set of reference radios including at least one secondary reference radio from a plurality of secondary reference radios, wherein:
   each secondary reference radio being previously unqualified and unauthorized as a source of location signals by a server that hosts a location service and has become established as a secondary reference radio by registering a location of the secondary radio with the server and qualifying with the server as an authorized source of location signals by the location of the secondary radio having a precision that is greater than a predetermined location precision threshold, the location of the secondary reference radio determined as a function of location signals received by the secondary reference radio from a second set of reference radios, and each radio in the second set of reference radios being a radio previously qualified as either a primary reference radio or one of the plurality of secondary reference radios in a database of primary reference radios and secondary reference radios, each primary reference radio being a fixed-location radio device.

2. The electronic device of claim 1, wherein the control circuitry is further configured to:

register the determined location with the server, the server hosting a location service for electronic devices and, once registered, the electronic device being qualified as one of the secondary reference radios for the electronic devices that use the location service to determine their respective locations; and transmit signals via the communication circuitry that aid the electronic devices that use the location service in determining their respective locations.

3. The electronic device of claim 2, wherein the signals transmitted by the electronic device are positioning reference signals.

4. The electronic device of claim 2, wherein the signals transmitted by the electronic device are WiFi beacons.

5. The electronic device of claim 2, wherein the signals transmitted by the electronic device are one of Bluetooth beacons or RF ID signals.

6. The electronic device of claim 1, wherein the electronic device is an access point that provides network connectivity to one or more user equipment devices.

7. The electronic device of claim 6, wherein the electronic device is a WiFi access point.

8. The electronic device of claim 1, wherein the electronic device is a user equipment device.

9. The electronic device of claim 1, wherein the first set of reference radios comprises at least one primary reference radio.

10. The electronic device of claim 1, wherein the second set of reference radios comprises at least one primary reference radio.

11. The electronic device of claim 1, wherein the second set of reference radios comprises at least one secondary reference radio.

12. The electronic device of claim 1, wherein determining the location of the electronic device includes triangulating a position for the electronic device at the server.

13. The electronic device of claim 1, wherein the primary reference radios comprise base stations of one or more cellular networks.

14. The electronic device of claim 1, wherein the primary reference radios comprise terrestrial navigation transmitters.

15. The electronic device of claim 1, wherein the signals received from primary reference radios are positioning reference signals.

16. The electronic device of claim 1, wherein each location signal received at the electronic device includes a location value of the corresponding radio in the first set of reference radios.

17. A server that hosts a location service, comprising:

a processor that executes logical instructions to determine a location of an electronic device that senses location signals from qualified reference radios, information regarding the qualified reference radios stored in a database in a memory of the server, the information including identities of qualified primary reference radios, identities of qualified secondary reference radios and locations of each of the qualified primary and secondary reference radios, wherein:

the qualified primary reference radios being fixed location radios, and each qualified secondary reference radio being previously unqualified and unauthorized as a source of location signals by the server is autonomously registered with the server and the server has qualified as an authorized source of location signals by the location of the secondary radio having a precision that is greater than a predetermined location precision threshold, the location of the secondary reference radio was determined as a function of location signals received by the secondary reference radio from a set of reference radio devices comprising qualified primary reference radios identified in the database, previously qualified secondary reference radios identified in the database, or one or more qualified primary reference radios and one or more previously qualified secondary reference radios that are identified in the database.

18. The server of claim 17, wherein the determined location of the electronic device controls routing of an emergency call made by the electronic device.

19. The electronic device of claim 1, wherein each secondary reference radio that is qualified as a secondary reference radio in the database transmits location signals that include a code or other information that identifies the secondary reference radio as having been qualified as an authorized source of location signals by the server.

20. The server of claim 17, wherein each secondary reference radio that is qualified as a secondary reference radio in the database transmits location signals that include a code or other information that identifies the secondary reference radio as having been qualified as an authorized source of location signals by the server.

* * * * *